Oct. 10, 1944.                    C. E. BOWERS                    2,360,101
                    WELDING HELMET FRICTION JOINT ASSEMBLY
                           Filed March 30, 1942
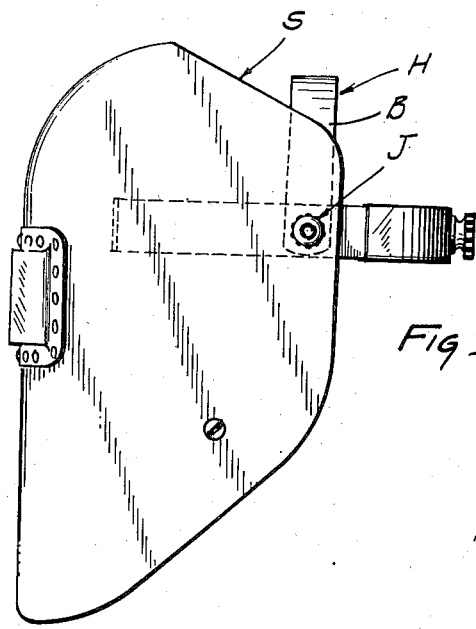
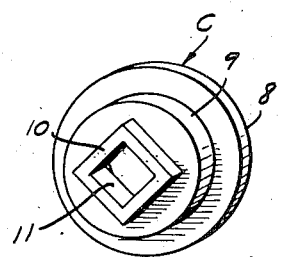
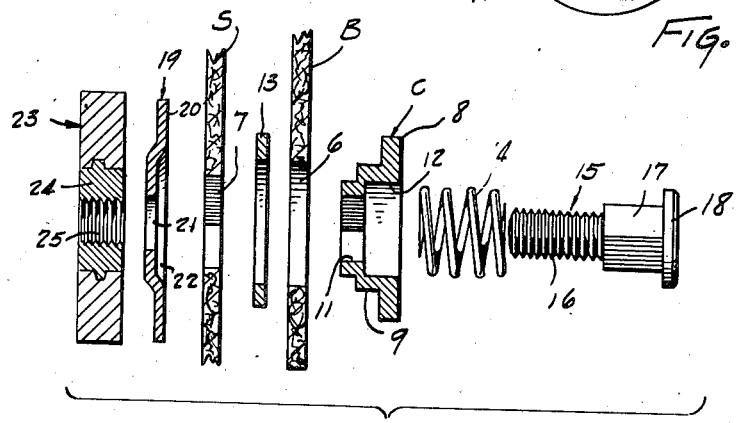
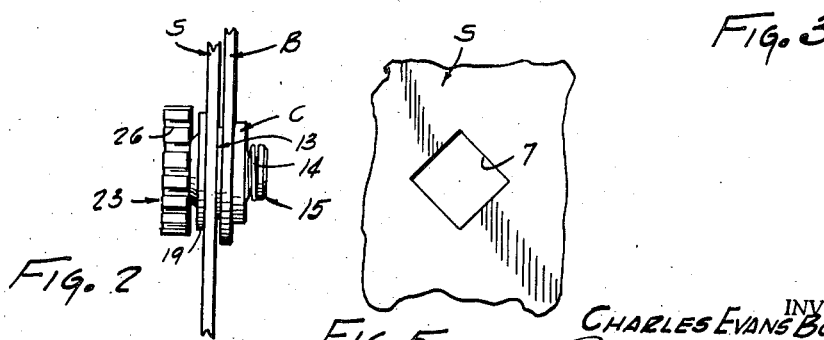
INVENTOR.
CHARLES EVANS BOWERS
BY
ATTORNEY Patented Oct. 10, 1944

2,360,101

UNITED STATES PATENT OFFICE 2,360,101

WELDING HELMET FRICTION JOINT ASSEMBLY

Charles Evans Bowers, Moylan, Pa.

Application March 30, 1942, Serial No. 436,746

3 Claims. (Cl. 2—8)

This invention relates in general to the welding shield art, which is illustrated in part in Patents Nos. 2,111,747 and 2,167,969, issued to Frederick M. Bowers on March 22, 1938, and August 1, 1939, respectively.

The general object of this invention is to provide an improved friction joint which is useful in connection with a combined welding shield and headgear with respect to which it is mounted pivotally as shown in the above mentioned patents.

In general there are several desirable attributes of a device of this kind. While the primary object is to effect a pivotal union between the headgear and the shield which will resist pivotal motion to a desired degree, the attainment of this object alone would not be sufficient to provide a satisfactory friction joint.

The matters of cost, weight, number of parts, assembly operations, adjustment operations, longevity, and certainty of friction maintained must be kept in mind if a highly satisfactory friction joint is to be created.

Another object of this invention is to incorporate into one friction joint such construction and parts as to provide properly for all of the above mentioned matters.

One of the difficulties in this specific art has been caused by the seemingly unpredictable characteristics of vulcanized fiber, which is employed customarily in making welders' shields and the headgear parts which co-operate with the shields in enabling a welder to raise his shield so as to inspect the work with the naked eye rather than inspect it through the filter glasses of the sight opening.

Vulcanized fiber is prone to expand in damp weather and to shrink in dry surroundings. A friction joint must be capable of sufficient and easy adjustment to make the friction joint meet the circumstances under which it is being employed. In addition to this adjustment, it is highly desirable to provide a friction joint which may be used without alterations in shields and headgears in which the parts are of different dimensions in thickness, as well as to accommodate manufacturing tolerances. One of the objects of this invention deals especially with this object.

In accomplishing the above objects I, of course, employ a headgear part and welding shield which is swingable with respect thereto. Further, I employ one of the said parts with means to prevent rotation of friction joint parts with respect thereto, and finally I provide adjustable tension means to hold the headgear and shield in desired relation to each other and interpose a formed cup shaped washer which within all customary limits will keep the friction joint in operative condition even though the dimensions of materials and parts vary considerably.

My invention, therefore, comprises the customary shield parts which are to be secured together, pivot means, tension means, rotation preventing means for some of said friction joint parts, and adjustment means, and variation accommodating means.

A better and more complete understanding of my invention may be had with reference to the accompanying drawing in which like numbers hereinafter denote corresponding parts and in which Figure 1 is a side elevation view of a welding shield mounted upon a headgear by means of my improved friction joint; Figure 2 is a rear end view of my improved joint and associated shield parts; Figure 3 is a detailed view of the friction joint parts shown in exploded relation; Figure 4 is a perspective view of a keying washer which serves additional functions as hereinafter pointed out, and Figure 5 is a detailed view of a portion of a welder's shield which carries an opening through which parts of my friction joint pass to anchor the shield to the headgear.

Referring now to Figure 1, the letter S denotes generally a complete welding shield which includes my improved friction joint indicated at J. A headgear H is provided with a downwardly depending bracket strip B at each side thereof and the lower extremities of these bracket strips support the friction joints J, which in turn carry the shield S.

In general, the broad description just given is applicable to corresponding parts shown in Frederick M. Bowers' Patent No. 2,111,747, issued March 22, 1938, and mentioned above.

Referring now to Figure 3, the bracket strip B is provided with an annular opening 6 adjacent its lower end and the side panel of shield S is provided with a square opening 7 adjacent its rear edge and top. The bracket strip and shield are pivotally secured together by the friction joint parts which will now be described.

A bearing cup C, as shown in perspective in Figure 4, comprises an annular washer part 8 and annular bearing shoulder 9 and a square shank 10, which is provided with a square opening 11. This opening 11 opens into an annular recess 12, which is co-axial with the washer and bearing portions 8 and 9 respectively.

An annular washer 13 having an opening of a diameter similar to the outside diameter of shoulder 9 is interposed between bracket strip B and the side panel of shield S and provides a clamping surface around its inner face which cooperates with the outer face of the washer part 8 of bearing cup C. Shoulder 9 passes through the opening of washer 13 and serves as a bearing therefor.

The annular cup shaped recess 12 of bearing C receives a coiled spring 14 whose outside diameter is slightly less than that of the cup shaped recess and a bolt generally indicated at 15 carries a screw threaded end 16, a square shank 17 and an enlarged head 18.

A formed cup shaped washer 19 carries a flat annular flange 20 and a central aperture 21 around which a portion is raised from the flange 20 so as to provide an integral cup 22 large enough in diameter and depth to receive square shank 10 freely. A knob or knurled nut 23 is preferably formed of Bakelite or a similar material with a central metallic core 24 molded integrally therewith. Core 24 carries an internal thread 25, which cooperates with the threaded end 16 of bolt 15. The periphery of the knob or nut 23 is notched or knurled as at 26 to afford firm engagement by the fingers in adjustment operations.

In assembly, the spring 14 is placed over the threaded end 16 of the bolt 15 and the spring finally comes to rest against the face of enlarged head 18 and encompasses the squared shank 17. The threaded end of the bolt 15 is then passed through the square opening 11 of the bearing cup C and the spring 14 is received within the annular recess 12 while the square shank 17 extends into square opening 11. The squared shank 10 of bearing cup C is then passed through annular opening 6 of the bracket strip B and the annular shoulder 9 receives its bearing from the periphery of opening 6, while the squared shank 10 extends through the opening of washer 13 and the inner periphery of washer 13 bears upon the shoulder 9. Spring 14 in annular recess 12 actually extends through the bracket strip and a compact construction results.

The squared shank 10 is then extended through the squared opening 7 in the shield side panel and the threaded end 16 of bolt 15 passed through the opening 21 of the formed washer 19 and is finally received in the threaded opening 25 of the nut 23.

It can be seen that the squared shank 10 fitting within the squared opening 7 establishes a non-rotative relation between bearing cup C, spring 14, and bolt 15, but that these parts may rotate with respect to bracket strip B because the annular opening 6 thereof bears upon the annular shoulder 9 of cup C. However, the ease of rotation depends upon the amount of tension in spring 14 which tends to clamp bracket strip B against the steel washer 13, which in turn is clamped against the shield side panel. A tightening of the nut 23 forces the flange 20 of the washer 19 against the outer face of the shield panel and if the squared shank 17 of bolt 15 and squared shank 10 should be of such a great length as to extend beyond the outer face of the shield S, due to thickness variations, they will be received freely within the cup 22 and the clamping of the various parts will not be hindered by any protrusion of the shanks beyond the panel outer face and into abutting relation to nut 23. Thus variations in thickness of the bracket strip, the interposed washer 13 and the shield side panel, whether due to choice in the beginning or to climatic conditions, cannot interfere with the proper desired adjustment of the friction joint.

When it is desired to raise the shield S on the pivotal mounting it can be seen that the squared opening of the shield panel will turn the squared end 10 and the squared shank 17 and cause the rotation of bearing cup C, spring 14, and bolt 15. At the same time washer 20 and nut 23 will be carried in rotation by their frictional engagement with the panel side face and connection with threaded end 16. Rotational movement and friction as well, will be reflected between the inner-face of the side panel and the outer side of washer 13, between the inner-face of washer 13 and the outer face of bracket strip B, and finally between the inner-face of bracket strip B and the outer surface washer part 8. Thus wear will be distributed and when it becomes sufficiently extensive to require adjustment the nut 23 is tightened to increase the tension of spring 14 and the consequent increase of friction between the parts just mentioned.

It can be seen that assembly operations are simple, the number of parts is small, and adjustment is easy, while the degree of frictional resistance to rotation is adjustable to fine degrees within wide limits. The replacement of any part at any time for any object is a simple operation, and a user of the helmet may carry on his work with confidence that adjustments will be maintained at critical moments.

I claim:

1. In a protective device of the character described including a headband member and a shield member pivotally mounted on said headband member by a pivotal friction joint which has a non-rotative mounting with respect to one of said members, the improvement which comprises a pivotal frictional assembly including a cup bearing having a portion extending through an opening of one of said members and into an opening of the other of said members, a cup shaped washer spaced from and arranged to aid said cup bearing in clamping said members in desired relation to each other, a bolt and nut assembly holding said cup bearing and cup shaped washer in clamping relation, means for establishing a non-rotative relation between one of the parts of said nut and bolt assembly and said cup bearing, and spring means to aid in exerting a yielding friction to rotation between said headband member and said shield member.

2. In a protective device of the character described comprising a headband member and shield member pivotally mounted thereon by a friction joint, the improvement which comprises a pivotal friction joint assembly including a cup bearing having an annular flange and an annular bearing shoulder adjacent thereto, means for preventing rotation of said cup bearing with respect to one of said members, a washer arranged with its inner periphery upon said bearing shoulder, a washer having a face engaging said shield member and a cup shaped portion the bottom of which is spaced from said shield member, said cup shaped portion being arranged to receive the extremity of said cup bearing opposite its annular flange, a nut and bolt assembly holding said protective device members and said aforementioned pivotal friction joint assembly parts in adjustable and clamped relation, and tension means carried by said nut and bolt assembly.

3. In a protective device of the character described including a headband member and shield member pivotally and frictionally joined together, the improvement which consists of a friction joint including a cup bearing having an annular flange and a portion extending axially through aligned openings of said members, cooperating means carried by said cup bearing and one of said members establishing a non-rotative relation therebetween, a cup shaped washer in alignment with the openings of said members and arranged to receive a portion of said cup bearing, a bolt and nut assembly clamping said protective device members together between said cup shaped washer and the annular flange of said cup bearing, and tension means carried by said bolt and nut assembly in said cup bearing to provide a yielding resistance to rotation of one of said members with respect to the other.

CHARLES EVANS BOWERS.